(12) United States Patent
Soma

(10) Patent No.: US 11,021,192 B2
(45) Date of Patent: Jun. 1, 2021

(54) UNDERBODY STRUCTURE

(71) Applicant: HONDA MOTOR CO., LTD., Tokyo (JP)

(72) Inventor: Takayuki Soma, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 254 days.

(21) Appl. No.: 16/310,496

(22) PCT Filed: Jun. 28, 2017

(86) PCT No.: PCT/JP2017/023784
§ 371 (c)(1),
(2) Date: Dec. 17, 2018

(87) PCT Pub. No.: WO2018/012292
PCT Pub. Date: Jan. 18, 2018

(65) Prior Publication Data
US 2019/0329827 A1    Oct. 31, 2019

(30) Foreign Application Priority Data
Jul. 11, 2016   (JP) .............................. JP2016-137173

(51) Int. Cl.
*B62D 25/20*       (2006.01)
*B62D 25/16*       (2006.01)
(Continued)

(52) U.S. Cl.
CPC .............. *B62D 25/20* (2013.01); *B62D 25/16* (2013.01); *B60K 13/04* (2013.01); *B60R 13/083* (2013.01); *B62D 21/152* (2013.01); *B62D 25/025* (2013.01)

(58) Field of Classification Search
CPC .......................... B62D 25/20; B62D 25/2009; B62D 25/2036; B62D 25/16; B62D 25/025;
(Continued)

(56) References Cited

U.S. PATENT DOCUMENTS 4,514,008 A * 4/1985 Watanabe ............ B60K 15/073
280/835
8,752,885 B2 * 6/2014 Yang ...................... B62D 25/20
296/187.08
(Continued)

FOREIGN PATENT DOCUMENTS

| CN | 103129362 | 6/2013 |
| CN | 104114438 | 10/2014 |

(Continued)

OTHER PUBLICATIONS

Espacenet maching translation of JP 731 (Year: 2010).*
(Continued)

*Primary Examiner* — Hilary L Gutman
(74) *Attorney, Agent, or Firm* — Amin, Turocy & Watson LLP

(57) ABSTRACT

A underbody structure includes a tunnel brace (22) laid on a floor tunnel (18) of a vehicle. The tunnel brace (22) has a front convex section (71), a central groove section (72) and a rear convex section (73). The front convex section (71), the central groove section (72) and the rear convex section (73) are formed to have equal width dimensions with each other. The tunnel brace (22) is formed so as to have an M-shaped cross section by the front convex section (71), the central groove section (72) and the rear convex section (73). The tunnel brace (22) is formed such that the width dimension of the tunnel brace in the vehicle body forward/rearward direction has a maximum value at right and left end portions (22a, 22b) and has a minimum value at a central section (22c).

9 Claims, 12 Drawing Sheets

(51) Int. Cl.
*B60K 13/04* (2006.01)
*B60R 13/08* (2006.01)
*B62D 21/15* (2006.01)
*B62D 25/02* (2006.01)

(58) Field of Classification Search
CPC .... B62D 21/152; B62D 21/155; B62D 21/15; B62D 21/00; B60K 13/04; B60R 13/083
USPC .............................. 296/193.07, 204, 203.02
See application file for complete search history.

(56) References Cited

U.S. PATENT DOCUMENTS

| | | | | |
|---|---|---|---|---|
| 9,616,939 | B2* | 4/2017 | Natsume | B62D 25/2036 |
| 9,623,908 | B2* | 4/2017 | Natsume | B62D 21/06 |
| 9,914,481 | B2* | 3/2018 | Kumagai | B62D 25/2036 |
| 9,956,994 | B2* | 5/2018 | Kageyama | B62D 25/20 |
| 2010/0320801 | A1 | 12/2010 | Kitai et al. | |
| 2013/0257097 | A1* | 10/2013 | Kojo | B62D 21/15 |
| | | | | 296/187.08 |
| 2014/0021745 | A1* | 1/2014 | Yang | B62D 25/20 |
| | | | | 296/193.07 |
| 2016/0200191 | A1* | 7/2016 | Ito | B60K 15/073 |
| | | | | 280/834 |
| 2016/0207568 | A1* | 7/2016 | Natsume | B62D 21/06 |
| 2016/0207572 | A1* | 7/2016 | Natsume | B62D 25/20 |
| 2017/0057549 | A1* | 3/2017 | Saeki | B62D 25/2036 |
| 2019/0009833 | A1* | 1/2019 | Yamagishi | B62D 25/20 |
| 2019/0202286 | A1* | 7/2019 | Natsume | B62D 25/20 |
| 2019/0217891 | A1* | 7/2019 | Natsume | B62D 25/025 |
| 2019/0291573 | A1* | 9/2019 | Banno | B62D 25/20 |
| 2019/0382052 | A1* | 12/2019 | Natsume | B62D 25/20 |
| 2020/0001929 | A1* | 1/2020 | Ohba | B62D 21/15 |

FOREIGN PATENT DOCUMENTS

| | | | | |
|---|---|---|---|---|
| DE | 102004039700 | A1 * | 2/2006 | ............ B62D 29/00 |
| DE | 102008036339 | A1 * | 2/2010 | ............ B62D 25/20 |
| EP | 0359141 | A2 * | 3/1990 | ........... B62D 25/025 |
| JP | 57-199173 | | 12/1982 | |
| JP | 60-170216 | | 11/1985 | |
| JP | 63-43942 | | 3/1988 | |
| JP | 2010-228731 | | 10/2010 | |
| JP | 2011-000917 | | 1/2011 | |
| JP | 2012-011856 | | 1/2012 | |
| JP | 2013-226851 | | 11/2013 | |
| JP | 2014-227029 | | 12/2014 | |
| JP | 2015-151018 | | 8/2015 | |

OTHER PUBLICATIONS

International Search Report and Written Opinion for International Application No. PCT/JP2017/023784 dated Aug. 8, 2017, 10 pgs.
Chinese Office Action for Chinese Patent Application No. 201780035590.3 dated Jul. 17, 2020.

* cited by examiner

UNDERBODY STRUCTURE

TECHNICAL FIELD

The present invention relates to an underbody structure.

Priority is claimed on Japanese Patent Application No. 2016-137173, filed Jul. 11, 2016, the content of which is incorporated herein by reference.

BACKGROUND ART

As an underbody structure, a structure in which a floor lower brace (hereinafter, referred to as a tunnel brace) is laid over a front end portion of a floor tunnel is known. Since the tunnel brace is laid over the front end portion of the floor tunnel, it is possible to prevent the floor tunnel from being deformed so as to open at the tunnel brace (for example, see Patent Literature 1).

CITATION LIST

Patent Literature

[Patent Literature 1]
Japanese Unexamined Patent Application, First Publication No. 2015-151018

SUMMARY OF INVENTION

Technical Problem

Incidentally, a front end portion of a floor tunnel is adjacent to an engine compartment. Accordingly, exhaust system parts (in particular, large exhaust system parts such as the catalyst, chamber, or the like) of an engine are disposed on a front end portion of the floor tunnel. For this reason, when a tunnel brace is laid on the front end portion of the floor tunnel like the underbody structure in Patent Literature 1, it is conceivable that the exhaust system parts may interfere with the tunnel brace.

An aspect of the present invention is directed to providing an underbody structure capable of preventing a floor tunnel from being deformed so as to open and further minimizing interference with exhaust system parts.

Solution to Problem (1) A underbody structure according to an aspect of the present invention includes a floor tunnel protruding upward from a floor panel of a vehicle and extending in a vehicle body forward/rearward direction; and a tunnel brace laid on the floor tunnel and extending in a vehicle width direction, wherein the tunnel brace has: a front convex section formed at a front side of a vehicle body and extending in the vehicle width direction; a central groove section formed at a rear side of the front convex section in the vehicle body and extending along the front convex section in the vehicle width direction; and a rear convex section formed at a rear side of the central groove section in the vehicle body and extending along the central groove section in the vehicle width direction, wherein the front convex section, the central groove section and the rear convex section are formed to have equal width dimensions with each other in the vehicle body forward/rearward direction, and the tunnel brace is formed so as to have an M-shaped cross section by the front convex section, the central groove section and the rear convex section, and a front edge portion and a rear edge portion of a central section of the tunnel brace are formed in a curved manner such that a width dimension of the tunnel brace in the vehicle body forward/rearward direction has a maximum value at both end portions in the vehicle width direction, and has a minimum value at the central section in the vehicle width direction.

In this way, the front edge portion and the rear edge portion of the central section of the tunnel brace are formed in a curved manner such that the width dimension in the central section of the tunnel brace becomes a minimum value. Accordingly, it is possible to prevent interference with exhaust system parts of an engine (in particular, large exhaust system parts such as a catalyst, a chamber, or the like) in the central section of the tunnel brace.

Accordingly, at a front end portion of the floor tunnel immediately behind the engine compartment, which is a position where a density of the exhaust system parts is high and close to the exhaust system parts, it is possible to dispose the tunnel brace in an area where the exhaust system parts of the engine are disposed.

Here, the tunnel brace is formed to have an M-shaped cross section by the front convex section, the central groove section and the rear convex section. In addition, the width dimensions of the front convex section, the central groove section and the rear convex section are formed to be uniform (specifically, equally throughout the length) with each other. Accordingly, including a central section of the tunnel brace having a narrower width, it is possible to secure a large cross sectional area (a cross sectional secondary moment) throughout the length of the tunnel brace, and it is possible to minimize the stress concentration throughout the length of the tunnel brace.

Accordingly, for example, when a tensile load which widens an opening of the floor tunnel or a compressive load which narrows the opening is input to the tunnel brace, it is possible to support the input load by (transmitted to) the central section of the tunnel brace having a narrow width.

Accordingly, it is possible for the tunnel brace to prevent the opening of the floor tunnel from being opening deformed outward in the vehicle width direction due to a tensile load input to the tunnel brace.

In addition, it is possible for the tunnel brace to prevent the opening of the floor tunnel from being deformed (i.e., narrowed) inward in the vehicle width direction due to a compressive load input to the tunnel brace.

(2) In the aspect of the above mentioned (1), the underbody structure may further include: a tunnel lower frame installed on a lower surface of the floor panel and to which the tunnel brace is connected; a floor frame installed on an upper surface of the floor panel; and a gusset configured to connect the tunnel lower frame to the floor frame.

In this case, the tunnel lower frame is installed on the lower surface of the floor panel, and the tunnel brace is connected to the tunnel lower frame. Accordingly, rigidity and strength of the floor tunnel can be increased by the tunnel lower frame.

Further, the tunnel lower frame is connected to the floor frame using the gusset. Accordingly, rigidity and strength of the floor tunnel can be further increased by the floor frame.

(3) In the aspect of the above mentioned (2), the floor panel may have a floor panel ridge section on which the floor tunnel is laid, the tunnel lower frame may be installed on a lower surface of the floor panel ridge section, and the tunnel brace and the gusset may be disposed in a horizontal state.

In this way, the floor panel ridge section is formed on the floor panel. Since the floor panel ridge section is provided, the tunnel brace, the tunnel lower frame, the gusset and the floor panel can be disposed in a substantially horizontal state.

Accordingly, the minimum ground clearance can be set to a low level, and a fuel pipeline, cables, or the like, can be disposed below the floor panel ridge section. In addition, since the tunnel brace and the gusset are linearly disposed, the tunnel brace and the gusset can be further strengthened against a tensile load or a compressive load.

(4) In the aspect of the above mentioned (2) or (3), the tunnel brace and the gusset may be fastened to the tunnel lower frame using a common fastening member.

Accordingly, for example, a load input to the gusset can be efficiently transmitted to the tunnel brace via the fastening member. Accordingly, load transmissibility from the gusset to the tunnel brace can be increased.

(5) In the aspect of the above mentioned (5), the gusset may have an inner end portion on an inner side in the vehicle width direction that is connected to a bottom section of the tunnel lower frame, an outer end portion on an outer side in the vehicle width direction that is connected to the floor frame via the floor panel, and a working hole formed at a center thereof and configured to communicate with a joining section of the floor panel ridge section and the tunnel lower frame.

In this way, the working hole is formed in the gusset, and the working hole communicates with the joining section of the floor panel ridge section and the tunnel lower frame. Accordingly, when the tunnel lower frame is welded to the floor panel ridge section, a welding gun for spot welding can be inserted into the joining section from the working hole. Accordingly, the tunnel lower frame can be easily joined to the floor panel using the welding gun.

In addition, the outer end portion of the gusset is connected to the floor frame via the floor panel. Accordingly, the load input to the gusset and the tunnel brace can be supported by the floor frame.

(6) In the aspect of the above mentioned (5), the floor panel may have a first bead, the gusset may have a second bead that is continuous with the first bead, and the working hole may be formed in an inner section of the second bead.

Here, it is conceivable that rigidity and strength of the gusset cannot be easily secured because the working hole is formed in the gusset. Here, the working hole is formed in the inner section of the second bead. Accordingly, rigidity and strength of the gusset can be secured by the second bead. Accordingly, the load input from the first bead of the floor panel to the second bead of the gusset can be efficiently transmitted to the tunnel lower frame via the second bead.

(7) In the aspect of the above mentioned (5), the gusset may have: a circumferential edge step difference section in which a circumferential edge of the working hole is folded; and an electrodeposition coating liquid discharge groove that is continuous with the circumferential edge step difference section.

In this way, the circumferential edge of the working hole is folded in the circumferential edge step difference section. Accordingly, the circumferential edge of the working hole can be reinforced by the circumferential edge step difference section, and rigidity and strength of the gusset can be secured.

In addition, the discharge groove is continuous with the circumferential edge step difference section. Accordingly, upon electrodeposition coating of the vehicle body, an electrodeposition coating liquid can be guided from the circumferential edge step difference section via the discharge groove. Accordingly, the entire circumference of the gusset (in particular, the circumferential edge step difference section) can be formed through electrodeposition coating, and generation of rust in the gusset can be minimized.

(8) In the aspect of the above mentioned (2) or (3), the gusset may have: a front overhanging section that overhangs upward at a front side of the vehicle body; and a rear overhanging section that overhangs downward at a rear side of the vehicle body.

In this way, the front overhanging section of the gusset overhangs upward. In addition, the rear overhanging section of the gusset overhangs downward. The gusset (i.e., the front overhanging section and the rear overhanging section) extends in the vehicle width direction.

Accordingly, when a load is input to the gusset from the vehicle width direction, load transmissibility of the gusset can be increased.

In addition, the front overhanging section overhangs upward, and the rear overhanging section overhangs downward. Accordingly, when the gusset is coated with a chipping-resistant paint from a side obliquely in front and below thereof, it is possible to prevent the chipping-resistant paint from being blocked by the front overhanging section or the rear overhanging section. That is, since the front overhanging section overhangs upward and the rear overhanging section overhangs downward, it is possible to apply the chipping-resistant paint to the entire lower surface side of the gusset without being blocked by the front overhanging section or the rear overhanging section. Accordingly, the gusset can be sufficiently coated with the chipping-resistant paint. Accordingly, damage to the gusset due to chipping can be prevented.

(9) In the aspect of the above mentioned (2) or (3), the underbody structure may include a heat insulation plate disposed on the floor tunnel and attached to the tunnel lower frame using a pair of attachment sections in the vehicle body forward/rearward direction, and the tunnel brace may be attached between the pair of attachment sections of the heat insulation plate.

Here, in order to appropriately minimize opening deformation of the floor tunnel, the tunnel brace is preferably installed in the vicinity of the front end portion of the floor tunnel.

Meanwhile, the exhaust system parts of the engine (in particular, large exhaust system parts such as a catalyst, a chamber, or the like) are disposed in the vicinity of the front end portion of the floor tunnel. Accordingly, the heat insulation plate is disposed in the area in which the exhaust system parts are disposed. For this reason, it is conceivable that the heat insulation plate hinders installation of the tunnel brace.

Here, the heat insulation plate is attached to the tunnel lower frame using the pair of attachment sections. Further, the tunnel brace is attached between the pair of attachment sections of the heat insulation plate. In this way, since the tunnel brace is attached between the pair of attachment sections, the tunnel brace can be attached to the vicinity of the front end portion of the floor tunnel. Accordingly, it is possible to minimize opening deformation of the floor tunnel using the tunnel brace.

(10) In the aspect of the above mentioned (2) or (3), the underbody structure may include: a side sill installed at an outer side of the floor frame in the vehicle width direction; and a floor inclination brace laid on the side sill and the floor frame, the floor inclination brace may be connected to the tunnel brace via the floor frame and the gusset and form a rear cross member together with the tunnel brace and the gusset, and the rear cross member may be disposed rearward in the vehicle body compared to a foot space for an occupant.

In this way, the rear cross member is formed by the tunnel brace, the gusset and the floor inclination brace. The tunnel brace is laid on the floor tunnel.

Accordingly, for example, when a tensile load or a compressive load is input to the rear cross member, the input load can be supported by the rear cross member. Accordingly, it is possible for the rear cross member to prevent the floor tunnel from being deformed and opening outward in the vehicle width direction due to a tensile load input to the rear cross member.

In addition, it is possible for the rear cross member to prevent the floor tunnel from being deformed inward in the vehicle width direction due to a compressive load input to the rear cross member.

Here, a compressive load input to the rear cross member is applied, for example, when an impact load is input to the front end portion of the side sill due to a narrow offset collision.

A narrow off set collision is also referred to as a small overlap lap collision in which ¼ (25%) of the vehicle body front section collides with an obstacle such as an oncoming vehicle, a standing tree, or an electricity pole.

(11) In the aspect of the above mentioned (10), the underbody structure may include a front cross member connected to the side sill and installed forward in the vehicle body than the rear cross member, and the foot space may be formed as a closed space when seen in a plan view by the front cross member, the side sill and the rear cross member.

In this way, the foot space is formed as a closed space when seen in a plan view by the front cross member, the side sill and the rear cross member. Accordingly, the foot space can be reinforced by the front cross member, the side sill and the rear cross member. Accordingly, when a front impact accident occurs, the deformation of the foot space can be prevented.

Advantageous Effects of Invention

According to the aspect of the present invention, the tunnel brace is formed so as to have an M-shaped cross section and so as to have a minimum value of a width dimension at the central section thereof. Since the tunnel brace is formed to have the M-shaped cross section, a large cross sectional area at the central section can be secured. Accordingly, rigidity and strength at the central section are secured. Accordingly, it is possible for the tunnel brace to prevent the floor tunnel from being deformed in an opening direction.

In addition, the width dimension at the central section of the tunnel brace has the minimum value. Accordingly, it is possible to minimize interference of the central section of the tunnel brace with the exhaust system parts of the engine.

DESCRIPTION OF EMBODIMENTS

Figure 1:
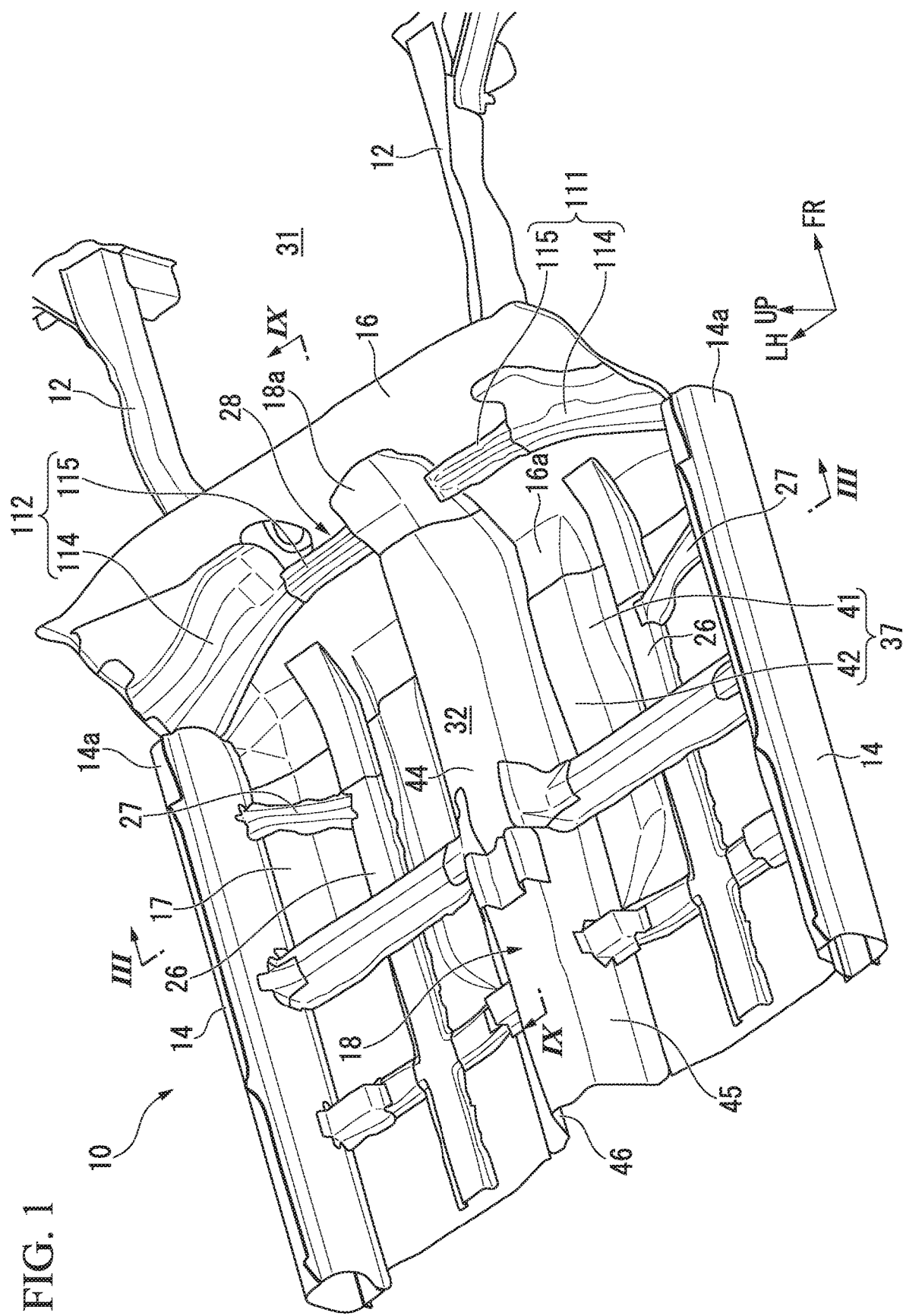
FIG. 1 is a perspective view showing a state in which an underbody structure according to an embodiment of the present invention is seen from a side at the rear of a vehicle body.

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Further, an underbody structure 10 of the embodiment has a configuration in which a left portion and a right portion are substantially laterally symmetrical with respect to each other, and hereinafter, components of the left portion and the right portion are designated by the same reference numerals, and the components of the right portion will be described in detail.

Figure 2:
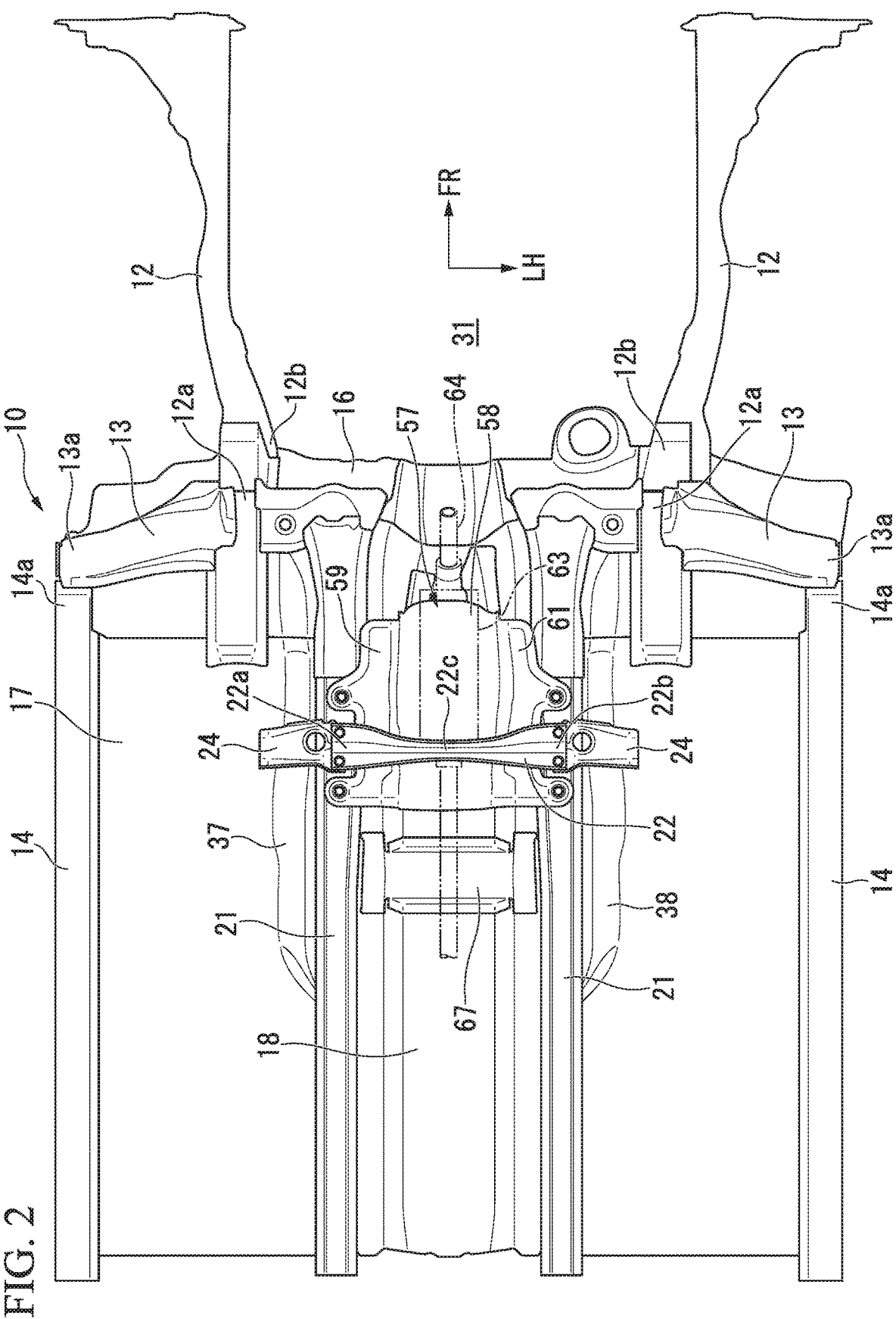
FIG. 2 is a bottom view showing a state in which the underbody structure according to the embodiment of the present invention is seen from below.

As shown in FIGS. 1 and 2, the underbody structure 10 includes a front side frame 12, an outrigger 13, a side sill 14, a lower dashboard 16, a floor panel 17, a floor tunnel 18, a tunnel lower frame 21, a tunnel brace 22, a gusset 24, a floor frame 26, a floor inclination brace 27 and a front cross member 28.

The front side frame 12 is disposed on an outer side in a vehicle width direction and extends in a vehicle body forward/rearward direction along an engine compartment 31.

The outrigger 13 extends outward from a rear lower end portion 12a of the front side frame 12 in a vehicle width direction.

The side sill 14 extends from an outer end portion 13a of the outrigger 13 toward a rear side of a vehicle body.

The lower dashboard 16 is installed on a rear end portion 12b of the front side frame 12. The lower dashboard 16 extends in the vehicle width direction and is installed on a left front pillar and a right front pillar.

Figure 3:
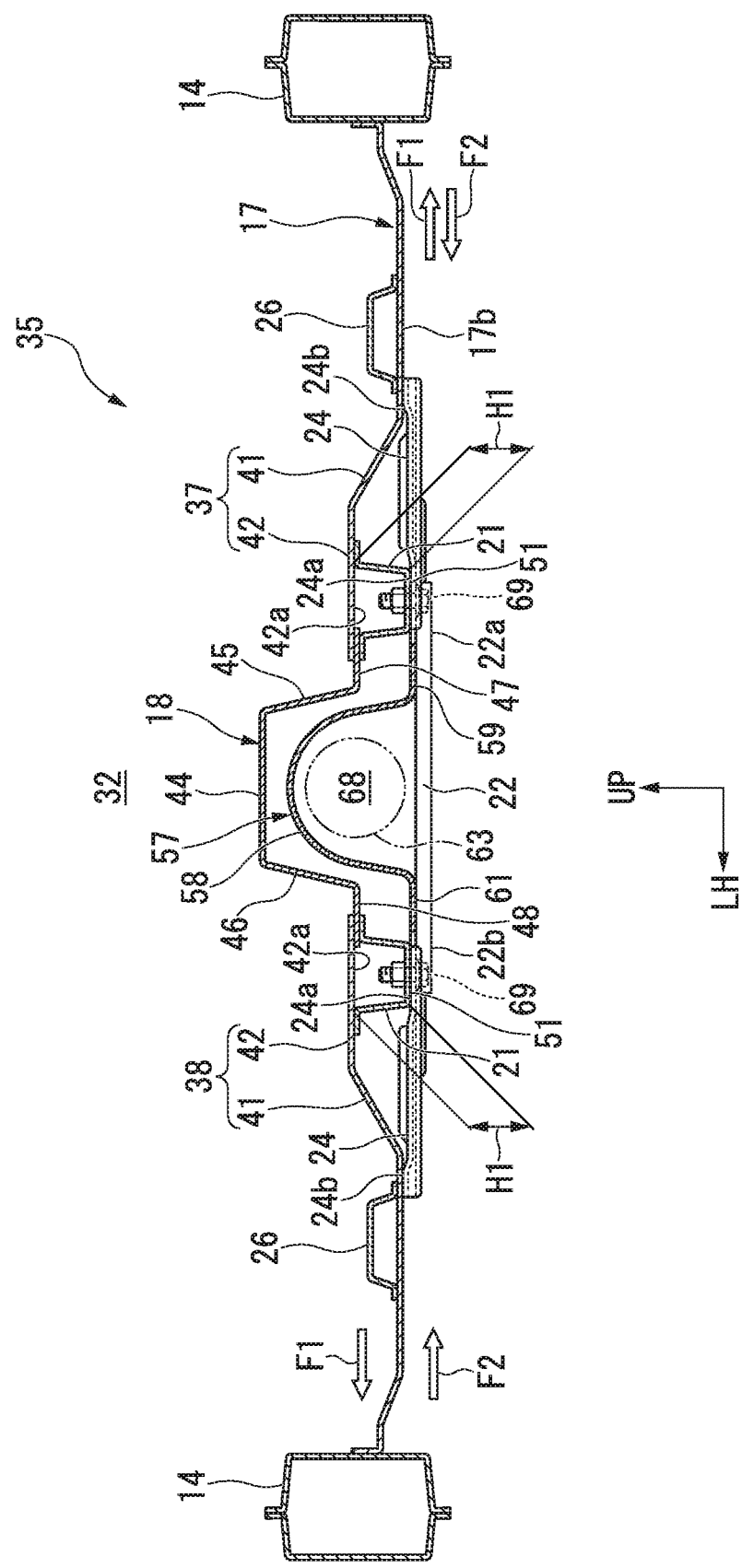
FIG. 3 is a cross-sectional view taken along line in FIG. 1 in the embodiment of the present invention.

As shown in FIG. 3, the floor panel 17 substantially horizontally extends from a lower end portion 16a (see FIG. 1) of the lower dashboard 16 toward a rear side of the vehicle body. A floor section of a passenger compartment 32 is formed on the floor panel 17. The floor panel 17 has a floor panel ridge section 35 formed at a center in the vehicle width direction, and a first bead 36 (see FIG. 4) extending outward from the floor panel ridge section 35 in the vehicle width direction.

The floor panel ridge section 35 has a right ridge section 37 and a left ridge section 38.

The right ridge section 37 is formed along a tunnel right sidewall 45 of the floor tunnel 18.

Specifically, the right ridge section 37 has a ridge sidewall 41 and a ridge apex section 42. The ridge sidewall 41 stands up from the floor panel 17 in an inclined form. The ridge apex section 42 overhangs from an upper end of the ridge sidewall 41 to the tunnel right sidewall 45 of the floor tunnel 18 toward an inner side in the vehicle width direction. The right ridge section 37 is constituted as a V-shaped cross section by the ridge sidewall 41 and the ridge apex section 42.

The left ridge section 38 is an area that is formed substantially laterally symmetrical with respect to the right ridge section 37, and parts of the left ridge section 38 are designated by the same reference numerals as those of the right ridge section 37 and detailed description thereof will be omitted.

Figure 4:
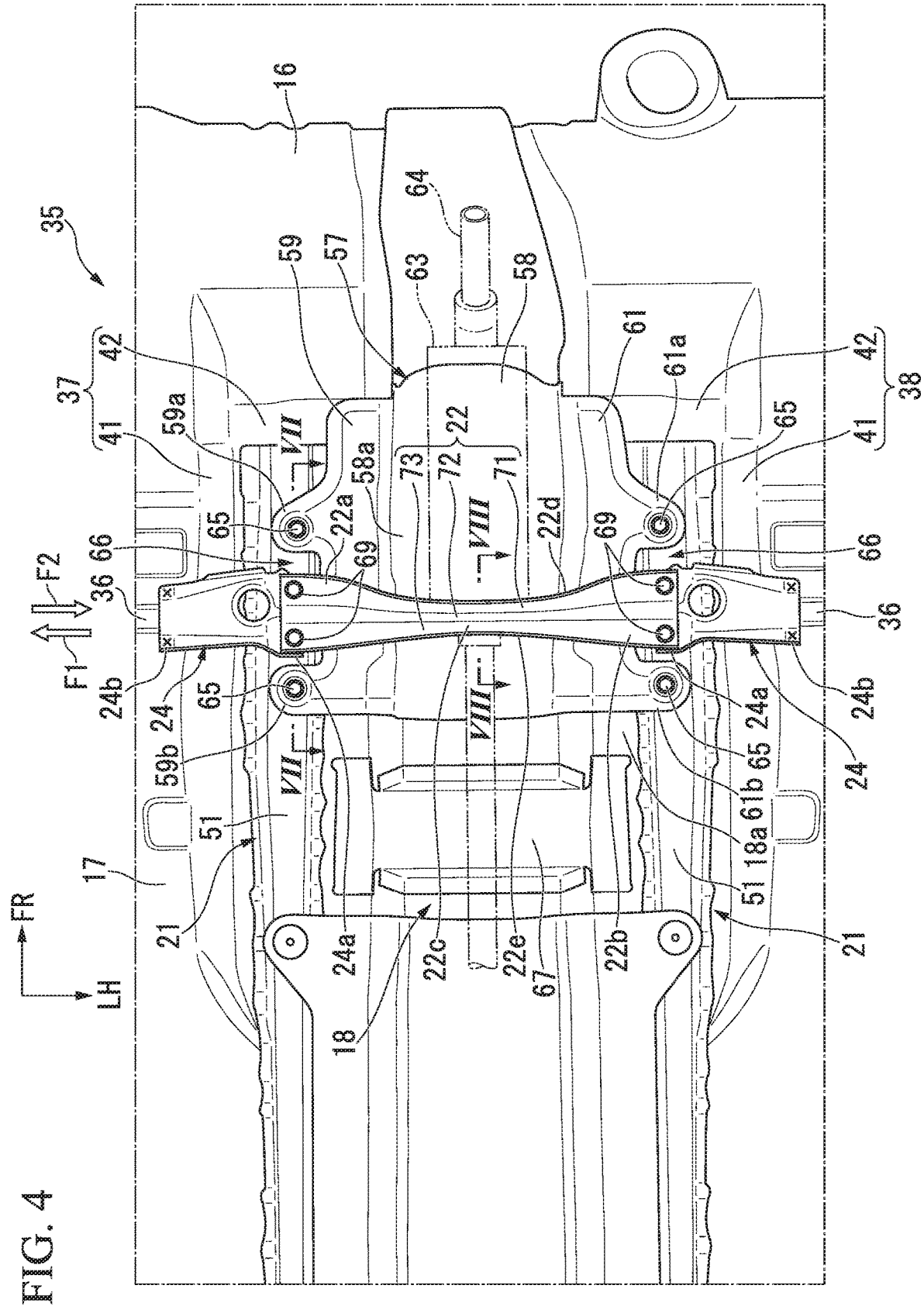
FIG. 4 is an enlarged bottom view of a tunnel brace and a gusset in FIG. 2 in the embodiment of the present invention.

As shown in FIG. 4, the first bead 36 extends from the right ridge section 37 toward an outer side in the vehicle width direction. The first bead 36 extends from the left ridge section 38 toward an outer side in the vehicle width direction. The first bead 36 expands downward. Further, the first bead 36 extends from the right ridge section 37 or the left ridge section 38 along an extension line of the tunnel brace 22 or the gusset 24.

Returning to FIG. 3, the floor tunnel 18 is installed on the right ridge section 37 and the left ridge section 38. The floor tunnel 18 extends from a center of the lower dashboard 16 (see FIG. 1) in the vehicle width direction toward a rear side of the vehicle body, and is disposed at a center in the vehicle width direction.

The floor tunnel 18 has a tunnel apex section 44, the tunnel right sidewall 45, a tunnel left sidewall 46, a tunnel right flange 47 and a tunnel left flange 48.

The tunnel apex section 44 is disposed at a predetermined height with respect to the floor panel 17. The tunnel right sidewall 45 is folded from a right portion of the tunnel apex section 44 toward the floor panel 17. The tunnel left sidewall 46 is folded from a left portion of the tunnel apex section 44 toward the floor panel 17.

The tunnel right flange 47 is folded from a lower end portion of the tunnel right sidewall 45 toward the ridge apex section 42 on a right side. The tunnel left flange 48 is folded from a lower end portion of the tunnel left sidewall 46 toward the ridge apex section 42 on a left side.

The floor tunnel 18 is formed as a hat-shaped cross section by the tunnel apex section 44, the tunnel right sidewall 45, the tunnel left sidewall 46, the tunnel right flange 47 and the tunnel left flange 48.

The tunnel right flange 47 is joined to the ridge apex section 42 on a right side. In addition, the tunnel left flange 48 is joined to the ridge apex section 42 on a left side. That is, the floor tunnel 18 is laid on the ridge apex section 42 on the right side and the ridge apex section 42 on the left side. In this state, the floor tunnel 18 is raised upward from the ridge apex section 42 on the right side and the ridge apex section 42 on the left side (i.e., the floor panel 17).

Figure 5:
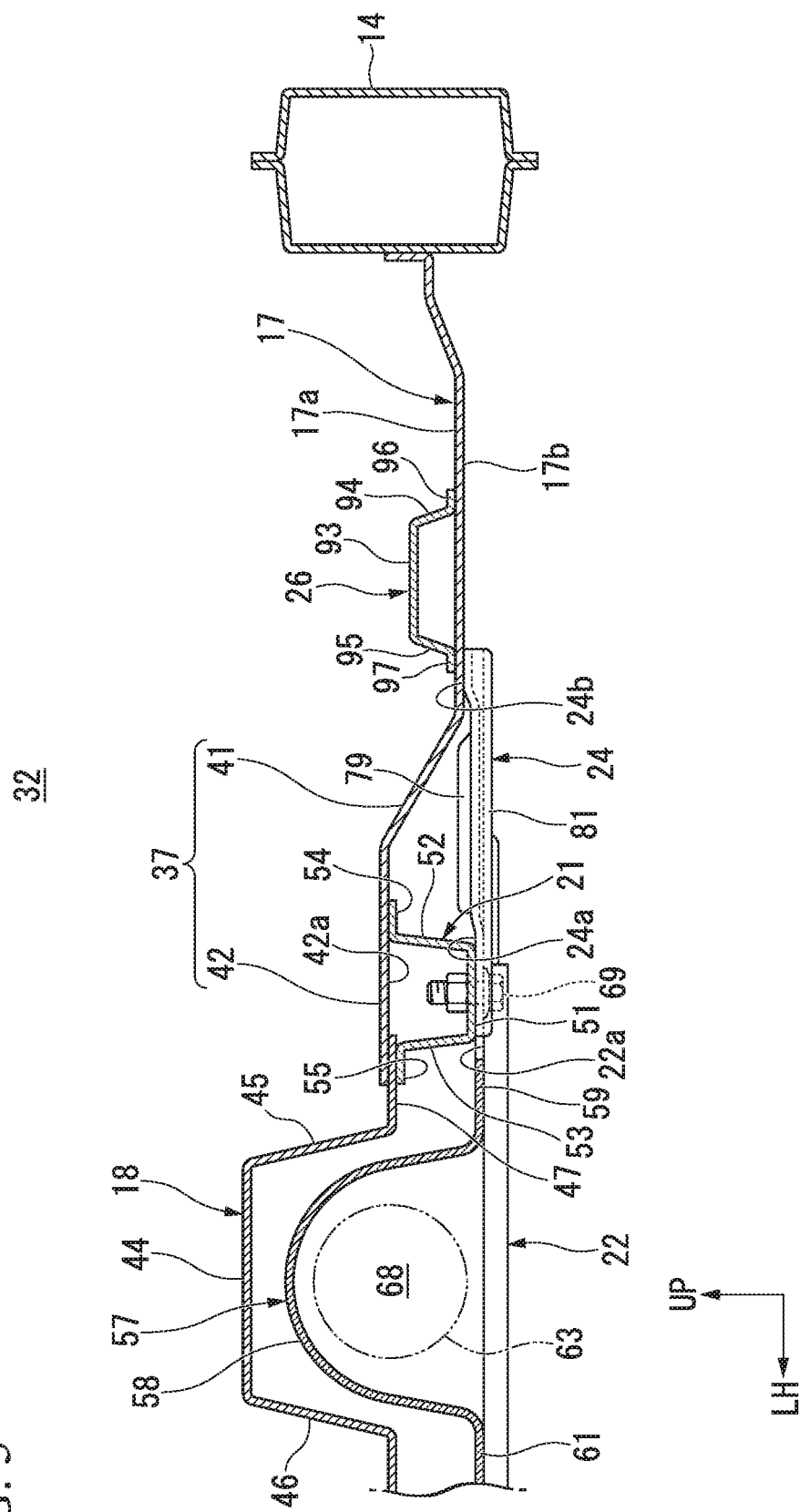
FIG. 5 is an enlarged cross-sectional view of a right portion in FIG. 3 in the embodiment of the present invention.

As shown in FIGS. 3 and 5, the tunnel lower frame 21 on the right side is installed on a lower surface 42a of the ridge apex section 42 on the right side. In addition, the tunnel lower frame 21 on the left side is installed on the lower surface 42a of the ridge apex section 42 on the left side.

Hereinafter, in order to facilitate understanding of the configuration, the ridge apex section 42 on the right side and the tunnel lower frame 21 on the right side will be described as the ridge apex section 42 and the tunnel lower frame 21.

The tunnel lower frame 21 has a lower frame bottom section 51, a lower frame outer sidewall 52, a lower frame inner sidewall 53, a lower frame outer flange 54 and a lower frame inner flange 55.

The lower frame bottom section 51 is disposed below the ridge apex section 42. The lower frame outer sidewall 52 is folded upward from an outer portion of the lower frame bottom section 51 toward the ridge apex section 42. The lower frame inner sidewall 53 is folded upward from an inner portion of the lower frame bottom section 51 toward the ridge apex section 42.

The lower frame outer flange 54 is folded rightward from an upper end portion of the lower frame outer sidewall 52 along the ridge apex section 42. The lower frame inner flange 55 is folded leftward from an upper end portion of the lower frame inner sidewall 53 along the tunnel right flange 47.

The tunnel lower frame 21 is formed as a hat-shaped cross section by the lower frame bottom section 51, the lower frame outer sidewall 52, the lower frame inner sidewall 53, the lower frame outer flange 54 and the lower frame inner flange 55.

The lower frame outer flange 54 and the lower frame inner flange 55 are joined to the lower surface 42a of the ridge apex section 42.

The lower frame inner flange 55 is joined to the lower surface 42a of the ridge apex section 42 via the tunnel right flange 47.

Figure 6:
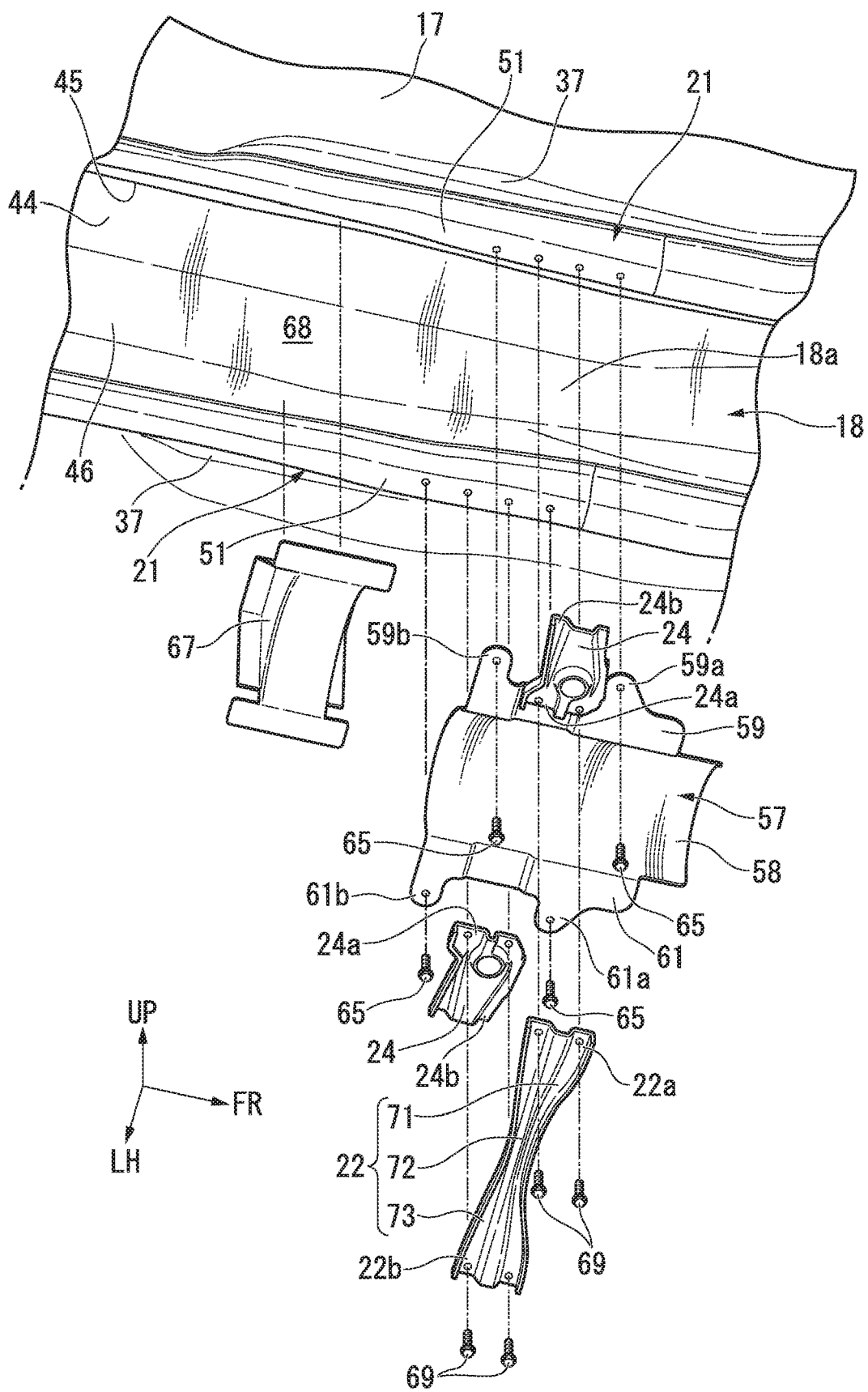
FIG. 6 is an exploded perspective view showing a state in which the underbody structure according to the embodiment of the present invention is seen from a side obliquely below the vehicle body.

As shown in FIGS. 5 and 6, a heat insulation plate 57 is disposed on a front end portion 18a of the floor tunnel 18. The heat insulation plate 57 has an expanding section 58, a right flange 59 and a left flange 61. The expanding section 58 expands upward along the floor tunnel 18.

Exhaust system parts (in particular, large exhaust system parts such as a catalyst, a chamber, or the like) 63 are disposed below the expanding section 58. The exhaust system parts 63 are connected to an exhaust manifold via an exhaust pipe 64 (see FIG. 4). The exhaust manifold is connected to an exhaust port of an engine.

The right flange 59 overhangs rightward from a right portion 58a of the expanding section 58 in the vehicle width direction. The right flange 59 has a pair of attachment sections 59a and 59b.

Hereinafter, for the convenience of easy understanding of the configuration, a side in front of the vehicle body of the pair of attachment sections 59a and 59b will be described as a front attachment section 59a, and a side in back of the vehicle body will be described as a rear attachment section 59b.

The front attachment section 59a and the rear attachment section 59b are disposed in a vehicle body forward/rearward direction at a predetermined interval. The front attachment section 59a and the rear attachment section 59b are fastened to the lower frame bottom section 51 of the tunnel lower frame 21 on the right side from below using bolts 65.

In addition, a front attachment section 61a and a rear attachment section 61b of the left flange 61 are fastened to the lower frame bottom section 51 of the tunnel lower frame 21 on the left side from below using the bolts 65. The left flange 61 is formed substantially laterally symmetrical with respect to the right flange 59.

The tunnel brace 22 is connected to the tunnel lower frame 21 on the right side and the tunnel lower frame 21 on the left side. The tunnel brace 22 is laid on the floor tunnel 18 via the tunnel lower frame 21 on the right side and the tunnel lower frame 21 on the left side (see also FIG. 3). In this state, the tunnel brace 22 extends in the vehicle width direction.

Specifically, a right end portion 22a of the tunnel brace 22 is attached between the front attachment section 59a and the rear attachment section 59b of the right flange 59 using a pair of bolts 69. In addition, a left end portion 22b of the tunnel brace 22 is attached between the front attachment section 61a and the rear attachment section 61b of the left flange 61 using the pair of bolts 69.

Further, a tunnel cross member 67 is installed at the tunnel brace 22 on a rear side of the vehicle body. The tunnel cross member 67 is laid on the tunnel right sidewall 45 and the tunnel left sidewall 46 of the floor tunnel 18.

Here, in order to appropriately prevent an opening of the floor tunnel 18 from opening deformation, the tunnel brace 22 may be installed in the vicinity of the front end portion 18a of the floor tunnel 18.

Meanwhile, the exhaust system parts 63 of the engine are disposed in the vicinity of the front end portion 18a of the floor tunnel 18. In addition, the heat insulation plate 57 is disposed on an area in which the exhaust system parts 63 are disposed.

For this reason, it is conceivable that the heat insulation plate 57 hinders setting of the tunnel brace 22.

Here, the front attachment section 59a and the rear attachment section 59b of the heat insulation plate 57 are attached to the tunnel lower frame 21 using the bolts 65. Further, the right end portion 22a of the tunnel brace 22 is attached between the front attachment section 59a and the rear attachment section 59b of the heat insulation plate 57 using the pair of bolts 69.

In this way, the right end portion 22a of the tunnel brace 22 is attached with the pair of bolts 69 while using a space 66 between the front attachment section 59a and the rear attachment section 59b of the heat insulation plate 57. Accordingly, the tunnel brace 22 can be attached to the vicinity of the front end portion 18a of the floor tunnel 18. Accordingly, it is possible to prevent the opening deformation of the floor tunnel 18 by using the tunnel brace 22.

As shown in FIG. 3, the tunnel lower frame 21 is installed on the lower surface 42a of the right ridge section 37 (specifically, the ridge apex section 42). In addition, the tunnel lower frame 21 is installed on the lower surface 42a of the left ridge section 38 (specifically, the ridge apex section 42). Further, the tunnel brace 22 is connected to the tunnel lower frame 21 on the right side and the tunnel lower frame 21 on the left side.

Accordingly, the tunnel brace 22 is lowered downward by a height dimension H1 of the tunnel lower frame 21 on the right side and the tunnel lower frame 21 on the left side. Accordingly, a large tunnel space 68 of the floor tunnel 18 is secured. Further, rigidity and strength of the floor tunnel 18 are increased by the tunnel lower frame 21 on the right side and the tunnel lower frame 21 on the left side.

As shown in FIGS. 4 and 6, the tunnel brace 22 has a front convex section 71, a central groove section 72 and a rear convex section 73.

The front convex section 71 is installed at a front side of the vehicle body and extends in the vehicle width direction. The central groove section 72 is formed rearward in the vehicle body than the front convex section 71. Further, the central groove section 72 extends along the front convex section 71 in the vehicle width direction. The rear convex section 73 is formed rearward in the vehicle body compared to the central groove section 72.

Further, the rear convex section 73 extends along the central groove section 72 in the vehicle width direction.

Figure 7:
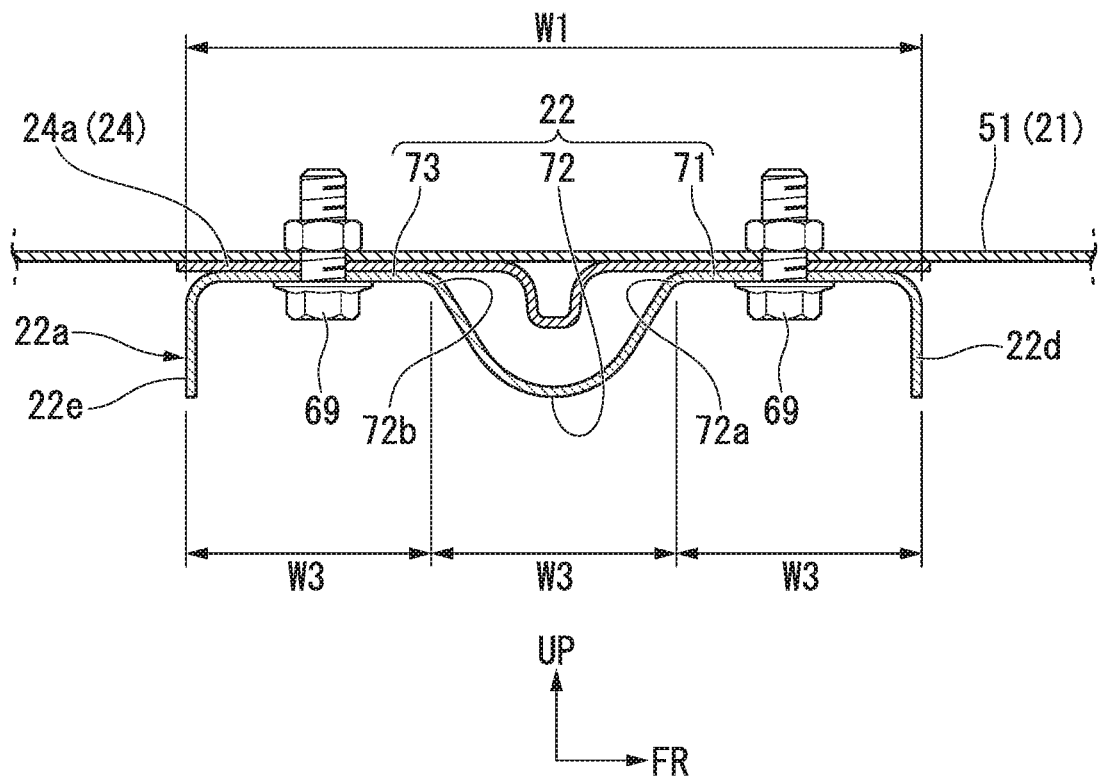
FIG. 7 is a cross-sectional view taken along line VII-VII in FIG. 4 in the embodiment of the present invention.
Figure 8:
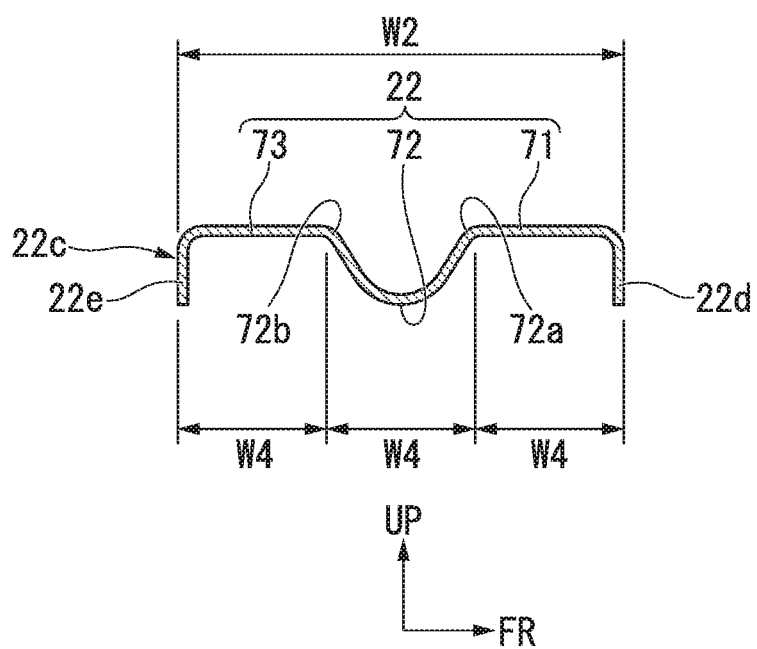
FIG. 8 is a cross-sectional view taken along line VIII-VIII in FIG. 4 in the embodiment of the present invention.

As shown in FIGS. 7 and 8, the central groove section 72 is formed as the V-shaped cross section to expand downward. The front convex section 71 overhangs from a front upper edge 72a of the central groove section 72 toward a front side of the vehicle body. A front edge portion 22d of the front convex section 71 (i.e., the front edge portion 22d of the tunnel brace 22) is folded downward. The front convex section 71 is formed to expand upward together with an area in the vicinity of the front upper edge 72a of the central groove section 72.

The rear convex section 73 overhangs from a rear upper edge 72b of the central groove section 72 toward a front side of the vehicle body. A rear edge portion 22e of the rear convex section 73 (i.e., the rear edge portion 22e of the tunnel brace 22) is folded downward. The rear convex section 73 is formed to expand upward together with an area in the vicinity of the rear upper edge 72b of the central groove section 72. In addition, the front convex section 71 and the rear convex section 73 are formed to be flush along with an inner end portion 24a of the gusset 24. Further, the tunnel brace 22 is formed to have an M-shaped cross section by the front convex section 71, the central groove section 72 and the rear convex section 73.

The tunnel brace 22 has the right end portion 22a, the left end portion 22b (see FIG. 4) and a central section 22c. The right end portion 22a and the left end portion 22b are laterally symmetrical areas, and areas of the left end portion 22b are designated by the same reference numerals as the right end portion 22a and detailed description thereof will be omitted.

A width dimension of the right end portion 22a and the left end portion 22b is set as a maximum value W1. In addition, a width dimension of the central section 22c is set as a minimum value W2. That is, a width dimension W1 of the right end portion 22a and the left end portion 22b is larger than a width dimension W2 of the central section 22c.

The right end portion 22a of the tunnel brace 22 is formed as W3 such that each of the width dimensions of the front convex section 71, the central groove section 72 and the rear convex section 73 in the vehicle body forward/rearward direction are equal with each other. In addition, like the right end portion 22a, the left end portion 22b of the tunnel brace 22 is formed as W3 such that each of the width dimensions of the front convex section 71, the central groove section 72 and the rear convex section 73 in the vehicle body forward/rearward direction are equal with each other.

Further, the central section 22c of the tunnel brace 22 is formed as W4 such that each of the width dimensions of the front convex section 71, the central groove section 72 and the rear convex section 73 in the vehicle body forward/rearward direction are equal with each other.

A width dimension W3 of the right end portion 22a and the left end portion 22b is larger than a width dimension W4 of the central section 22c. That is, the tunnel brace 22 is formed in an area in which the central section 22c has a width narrower than that of other area.

In addition, each of the width dimensions of the front convex section 71, the central groove section 72 and the rear convex section 73 are equally formed throughout the length of the tunnel brace 22.

Incidentally, the right end portion 22a of the tunnel brace 22 is formed so as to have the M-shaped cross section by the front convex section 71, the central groove section 72 and the rear convex section 73. In addition, the left end portion 22b of the tunnel brace 22 is formed so as to have the M-shaped cross section by the front convex section 71, the central groove section 72 and the rear convex section 73. In addition, further, the central section 22c of the tunnel brace 22 is formed so as to have the M-shaped cross section by the front convex section 71, the central groove section 72 and the rear convex section 73. That is as described above, the tunnel brace 22 is formed so as to have the M-shaped cross section.

In this way, each of the width dimensions of the front convex section 71, the central groove section 72 and the rear convex section 73 are equally formed throughout the length of the tunnel brace 22, and the tunnel brace 22 is formed so as to have the M-shaped cross section. Accordingly, including the central section 22c of the tunnel brace 22 having a narrower width, a larger cross sectional area (a cross sectional secondary moment) can be secured throughout the length of the tunnel brace 22, and stress concentration can be minimized throughout the length of the tunnel brace 22.

Here, for example, a tensile load F1 (see FIG. 3) of widening the opening of the floor tunnel 18 or a compressive load F2 (see FIG. 3) of narrowing the opening is input to the tunnel brace 22. Here, the input loads F1 and F2 can be supported by (transmitted to) the central section 22c of the tunnel brace 22 having a narrower width.

Accordingly, as shown in FIG. 4, it is possible for the tunnel brace 22 to prevent the opening of the floor tunnel 18 from being deformed so as to open toward an outer side in the vehicle width direction due to the tensile load F1 input to the tunnel brace 22.

In addition, it is possible for the tunnel brace 22 to prevent the opening of the floor tunnel 18 from being deformed (i.e., narrowed) toward an inner side in the vehicle width direction due to the compressive load F2 input to the tunnel brace 22.

Further, in the central section 22c of the tunnel brace 22, the front edge portion 22d of the tunnel brace 22 (i.e., the front convex section 71) is curved to be recessed toward a rear side of the vehicle body. Further, in the central section 22c of the tunnel brace 22, the rear edge portion 22e of the tunnel brace 22 (i.e., the rear convex section 73) is curved to be recessed toward a front side of the vehicle body.

Figure 9:
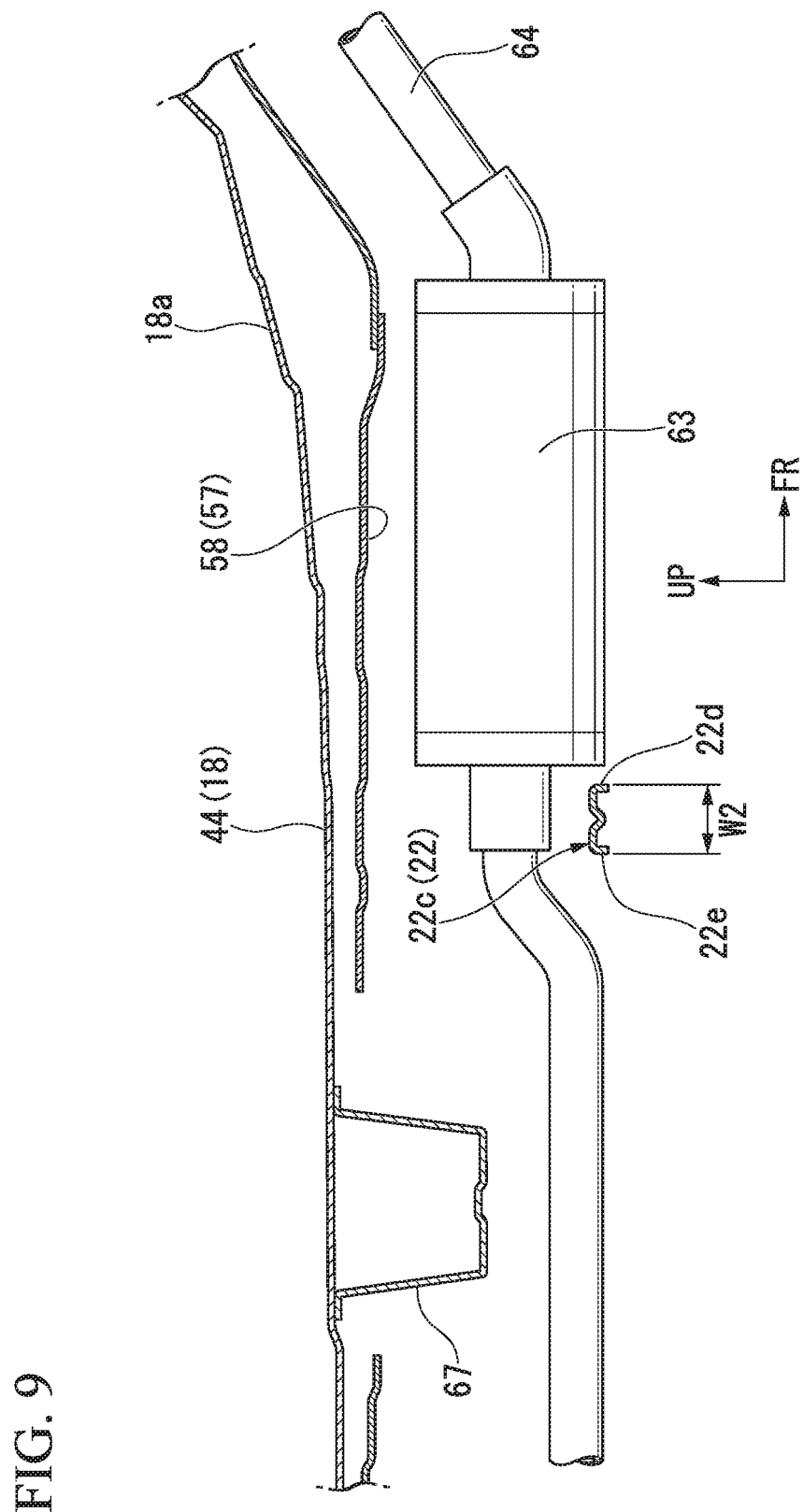
FIG. 9 is a cross-sectional view taken along line IX-IX in FIG. 1 in the embodiment of the present invention.

As shown in FIG. 9, the front edge portion 22d and the rear edge portion 22e of the central section 22c are formed to be curved such that the width dimension W2 has a minimum value in the central section 22c of the tunnel brace 22 (see also FIG. 4). Accordingly, it is possible to prevent interference of the central section 22c of the tunnel brace 22 with the exhaust system parts of the engine (in particular, large exhaust system parts such as a catalyst, a chamber, or the like) 63.

That is, the front end portion 18a of the floor tunnel 18 is adjacent to immediately behind the engine compartment 31 (see FIG. 1) and disposed at a position, at which a density of the exhaust system parts is high, close to the exhaust system parts 63. Here, the width dimension W2 of the central section 22c of the tunnel brace 22 is set as a minimum value, and interference of the tunnel brace 22 with the exhaust system parts 63 is minimized.

Accordingly, in the front end portion 18a of the floor tunnel 18, the tunnel brace 22 can be disposed in an area in which the exhaust system parts 63 of the engine are disposed.

As shown in FIGS. 5 and 6, the right end portion 22a of the tunnel brace 22 and the inner end portion 24a of the gusset 24 on the right side are commonly fastened to the tunnel lower frame 21 on the right side (specifically, the lower frame bottom section 51) using a common bolt (fastening member) 69. Further, the inner end portion 24a of the gusset 24 on the right side is joined to the lower frame bottom section 51 through, for example, spot welding (see FIG. 10).

Figure 10:
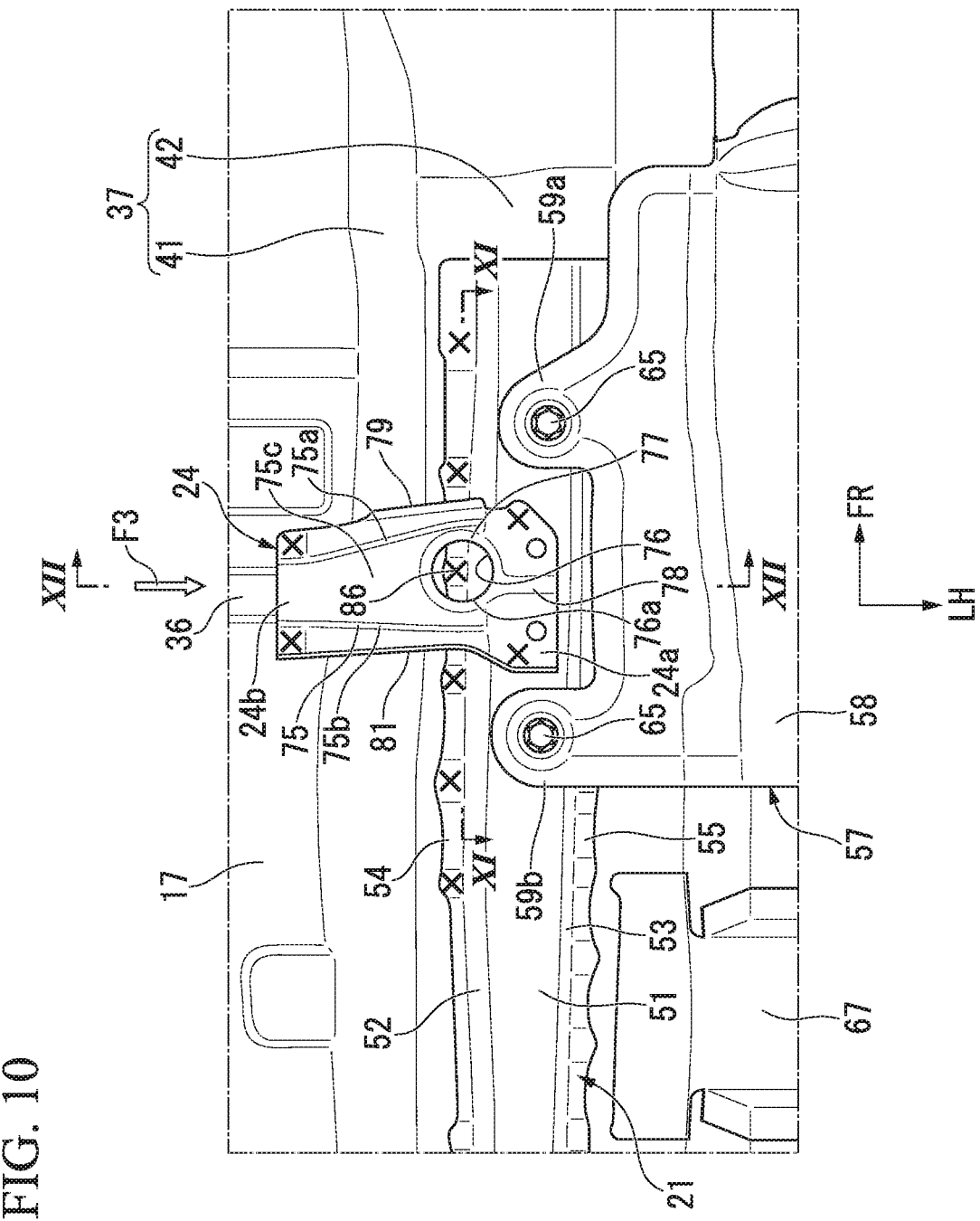
FIG. 10 is an enlarged cross-sectional view of a right portion in FIG. 4 in the embodiment of the present invention.

In addition, an outer end portion 24b of the gusset 24 on the right side is joined to the floor panel 17 in the vicinity of the right ridge section 37 through, for example, spot welding (see also FIG. 10). That is, the gusset 24 on the right side is connected to the tunnel lower frame 21 on the right side and the floor panel 17, and thus, disposed at a state in which crossing over the right ridge section 37.

In this state, the tunnel brace 22, the lower frame bottom section 51 of the tunnel lower frame 21 on the right side, the gusset 24 on the right side, and the floor panel 17 are disposed in a horizontal state.

As shown in FIG. 3, the left end portion 22b of the tunnel brace 22 and the gusset 24 on the left side are commonly fastened to the tunnel lower frame 21 on the left side (specifically, the lower frame bottom section 51) using the common bolts 69.

In addition, the outer end portion 24b of the gusset 24 on the left side is joined to the vicinity of the left ridge section 38 of the floor panel 17 through, for example, spot welding. That is, the gusset 24 on the left side is connected to the tunnel lower frame 21 on the left side and the floor panel 17, and thus, disposed at a state in which crossing over the left ridge section 38.

The inner end portion 24a of the gusset 24 on the right side is formed at an inner side of the gusset 24 on the right side in the vehicle width direction. The outer end portion 24b of the gusset 24 on the right side is formed at an outer side of the gusset 24 on the right side in the vehicle width direction.

In addition, the inner end portion 24a of the gusset 24 on the left side is formed at an inner side of the gusset 24 on the left side in the vehicle width direction. The outer end portion 24b of the gusset 24 on the left side is formed at an outer side of the gusset 24 on the left side in the vehicle width direction.

In this way, the right end portion 22a of the tunnel brace 22 and the inner end portion 24a of the gusset 24 on the right side are commonly fastened to the tunnel lower frame 21 on the right side using the bolts 69. In addition, the left end portion 22b of the tunnel brace 22 and the inner end portion 24a of the gusset 24 on the left side are commonly fastened to the tunnel lower frame 21 on the left side using the bolts 69.

In this state, the tunnel brace 22, the lower frame bottom section 51 of the tunnel lower frame 21 on the left side, the gusset 24 on the left side, and the floor panel 17 are disposed in a horizontal state.

As described above, the floor panel ridge section 35 is formed on the floor panel 17.

Further, the tunnel lower frame 21 on the right side is installed at the ridge apex section 42 on the right side of the floor panel ridge section 35, and the tunnel lower frame 21 on the left side is installed on the ridge apex section 42 on the left side of the floor panel ridge section 35.

Accordingly, the tunnel brace 22, the lower frame bottom section 51 of the tunnel lower frame 21 on the right side, the gusset 24 on the right side, and the floor panel 17 are disposed in a horizontal state. Further, the tunnel brace 22, the lower frame bottom section 51 of the tunnel lower frame 21 on the left side, the gusset 24 on the left side, and the floor panel 17 are disposed in a horizontal state.

Accordingly, a minimum ground clearance of the vehicle can be set to a low level, and a fuel pipeline, cables, or the like, can be disposed below a lower surface of the right ridge section 37 or the left ridge section 38.

In addition, the tunnel brace 22, the gusset 24 on the left side, and the gusset 24 on the right side are disposed in a linear shape (see also FIG. 4). Accordingly, for example, the tensile load F1 or the compressive load F2 input to the gusset 24 on the right side or the gusset 24 on the left side can be efficiently transmitted to the tunnel brace 22 via the bolts 69.

Accordingly, load transmissibility from the gusset 24 on the right side or the gusset 24 on the left side to the tunnel brace 22 is increased. That is, the tunnel brace 22, the gusset 24 on the right side, and the gusset 24 on the left side are strongly secured with respect to the tensile load F1 or the compressive load F2.

In addition, the outer end portion 24b of the gusset 24 on the right side is connected to the floor frame 26 on the right side via the floor panel 17. Further, the outer end portion 24b of the gusset 24 on the left side is connected to the floor frame 26 on the left side via the floor panel 17.

Accordingly, a load input to the gusset 24 on the right side, the gusset 24 on the left side, and the tunnel brace 22 can be supported by the floor frame 26 on the right side or the floor frame 26 on the left side.

Hereinafter, for the convenience of understanding of the configuration, the gusset 24 on the right side will be described as the gusset 24.

Figure 11:
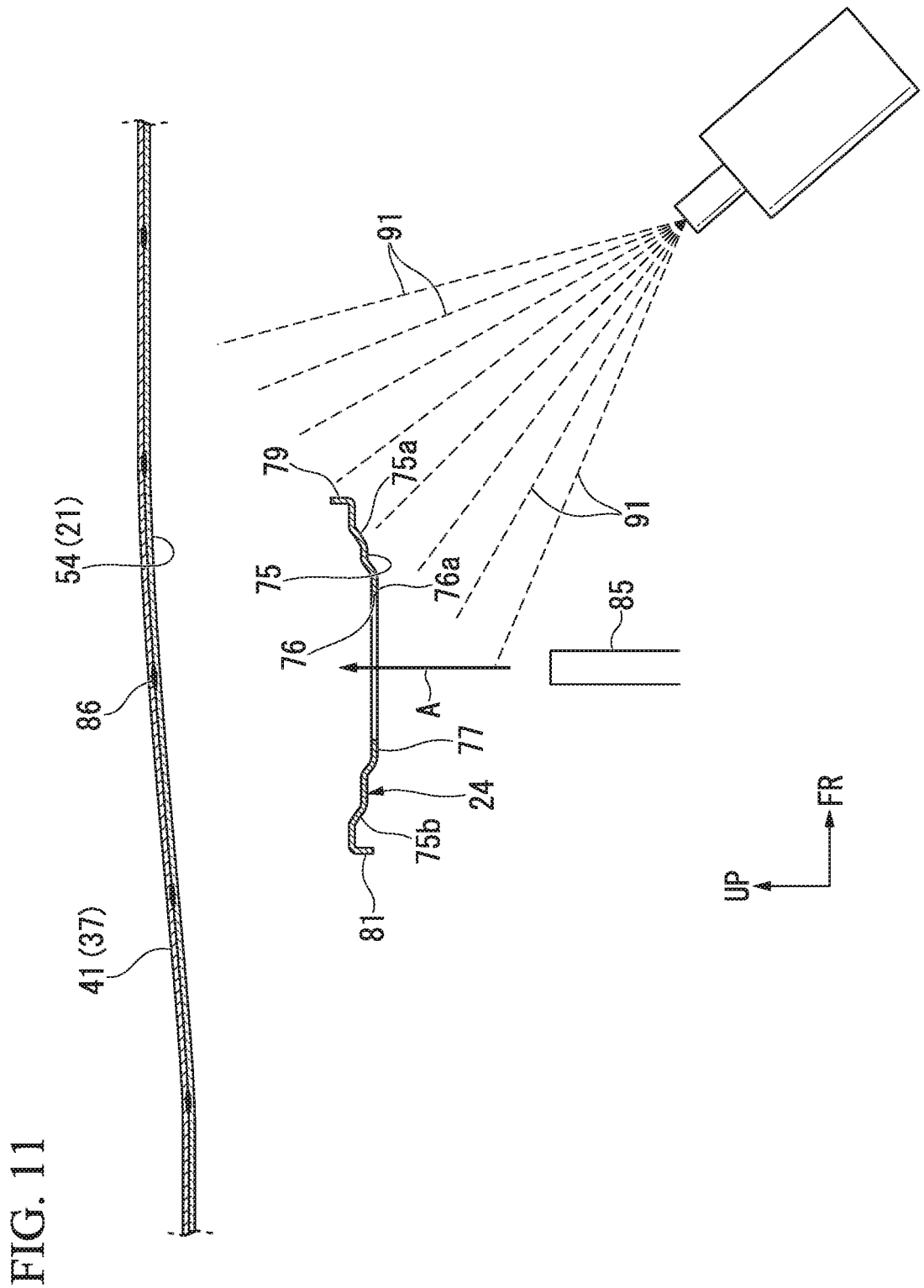
FIG. 11 is a cross-sectional view taken along line XI-XI in FIG. 10 in the embodiment of the present invention.

As shown in FIGS. 10 and 11, the gusset 24 is formed in a substantially rectangular shape when seen in a bottom view. The gusset 24 has a second bead 75, a working hole 76, a circumferential edge step difference section 77, a discharge groove 78 (see also FIG. 12), a front overhanging section 79 and a rear overhanging section 81. The second bead 75 expands downward. The second bead 75 extends along an extension line of the first bead 36 of the floor panel 17 or the tunnel brace 22 (see FIG. 4) in the vehicle width direction. That is, the second bead 75 extends to be continuous with the first bead 36 or the tunnel brace 22 in the vehicle width direction.

The working hole 76 is formed between a front wall 75a and a rear wall 75b of the second bead 75, i.e., in an inner section 75c of the second bead 75.

Here, the gusset 24 is connected to the tunnel lower frame 21 and the floor panel 17, and thus, disposed while crossing the right ridge section 37. In addition, the lower frame outer flange 54 of the tunnel lower frame 21 is joined to the right ridge section 37 through, for example, spot welding. For this reason, when the lower frame outer flange 54 is joined to the right ridge section 37 through spot bonding using a welding gun 85, it is conceivable that the gusset 24 hinders disposition of the welding gun 85 to a joining section 86.

Here, the working hole 76 is formed in the inner section 75c of the second bead 75. Further, the working hole 76 communicates with (specifically, confronts) the joining section 86 between the right ridge section 37 and the lower frame outer flange 54. Accordingly, when the lower frame outer flange 54 is joined to the right ridge section 37, the welding gun 85 can be inserted from the working hole 76 to the joining section 86 as indicated by an arrow A. Accordingly, the joining section 86 with the lower frame outer flange 54 can be easily joined to the right ridge section 37 by using the welding gun 85.

Incidentally, it is conceivable that rigidity and strength of the gusset 24 cannot be easily secured as the working hole 76 is formed in the gusset 24. Here, the working hole 76 is formed between the front wall 75a and the rear wall 75b of the second bead 75.

Accordingly, rigidity and strength of the gusset 24 can be secured by the second bead 75. Accordingly, a load F3 input from the first bead 36 of the floor panel 17 to the second bead 75 of the gusset 24 can be efficiently transmitted to the tunnel lower frame 21 via the second bead 75.

In addition, the circumferential edge step difference section 77 is formed on a circumferential edge 76a of the working hole 76. The circumferential edge step difference section 77 is folded such that the circumferential edge 76a of the working hole 76 expands downward. That is, the circumferential edge step difference section 77 is formed annularly along the circumferential edge 76a of the working hole 76.

Accordingly, the circumferential edge 76a of the working hole 76 is reinforced by the circumferential edge step difference section 77, and rigidity and strength of the gusset 24 are secured.

Figure 12:
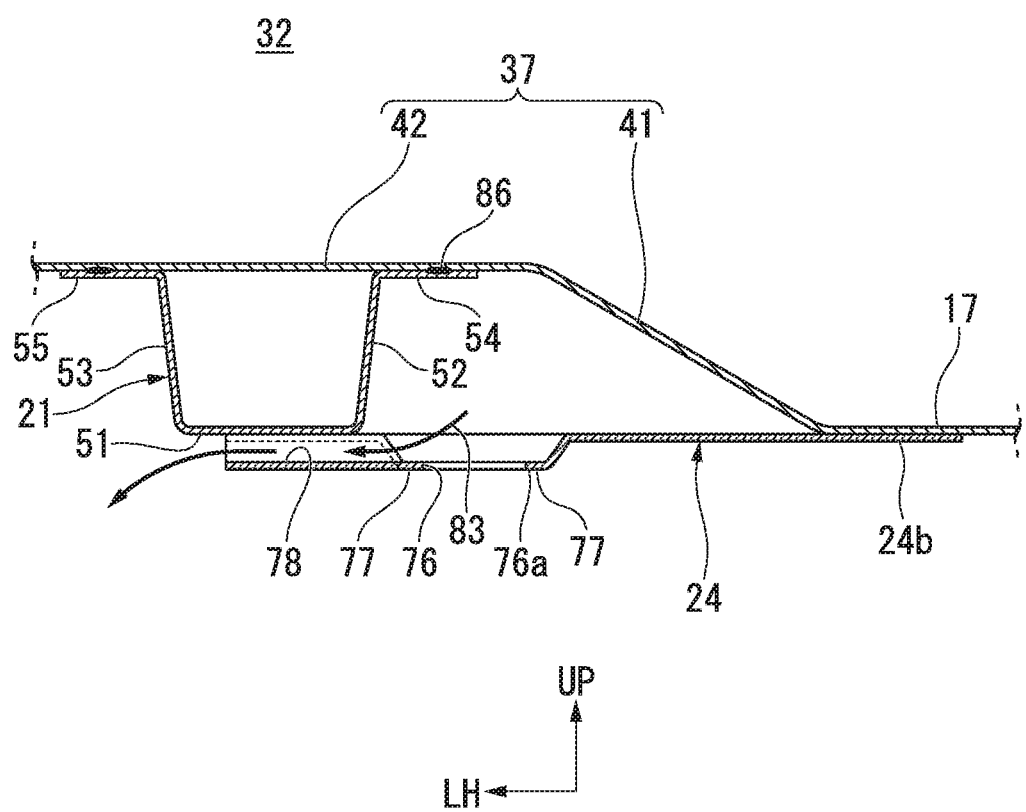
FIG. 12 is a cross-sectional view taken along line XII-XII in FIG. 10 in the embodiment of the present invention.

As shown in FIG. 12, the discharge groove 78 is formed to be continuous with the circumferential edge step difference section 77. The discharge groove 78 is a groove configured to discharge an electrodeposition coating liquid 83. Accordingly, since the discharge groove 78 is continuous with the circumferential edge step difference section 77, upon electrodeposition coating of the vehicle body, the electrodeposition coating liquid 83 can be guided from the circumferential edge step difference section 77 via the discharge groove 78 as indicated by the arrow.

Accordingly, the entire circumference of the gusset 24 (in particular, the circumferential edge step difference section 77) can be formed through electrodeposition coating, and generation of rust of the gusset 24 can be minimized.

As shown in FIGS. 10 and 11, the front overhanging section 79 is formed on the gusset 24 on a front side of the vehicle body. The front overhanging section 79 overhangs upward from a front edge of the gusset 24 and extends in the vehicle width direction. In addition, the rear overhanging section 81 is formed on the gusset 24 on a rear side of the vehicle body. The rear overhanging section 81 overhangs downward from a rear edge of the gusset 24 and extends in the vehicle width direction.

In this way, the front overhanging section 79 overhangs upward, and the rear overhanging section 81 overhangs downward. Further, the front overhanging section 79 or the rear overhanging section 81 extends in the vehicle width direction. Accordingly, when the load F3 is input to the gusset 24 from the vehicle width direction, load transmissibility of the gusset 24 can be increased.

In addition, the front overhanging section 79 overhangs upward, and the rear overhanging section 81 overhangs downward. Accordingly, it is possible to prevent the chipping-resistant paint 91 from being obstructed by the front overhanging section 79 or the rear overhanging section 81 when the gusset 24 is coated with a chipping-resistant paint 91 from a side obliquely in front and below thereof of the vehicle body. That is, since the front overhanging section 79 overhangs upward and the rear overhanging section 81 overhangs downward, the chipping-resistant paint 91 can be applied to the entire lower surface side of the gusset 24 without being blocked by the front overhanging section 79 or the rear overhanging section 81. Accordingly, the chipping-resistant paint 91 can be sufficiently applied on the gusset 24. Accordingly, damage to the gusset 24 due to the chipping can be prevented.

Returning to FIG. 5, the gusset 24 is connected to the tunnel lower frame 21 and the floor panel 17. Meanwhile, the floor frame 26 is installed on an upper surface 17a of the floor panel 17. The floor frame 26 has an upper frame apex section 93, an upper frame outer sidewall 94, an upper frame inner sidewall 95, an upper frame outer flange 96 and an upper frame inner flange 97.

The upper frame apex section 93 is disposed over the floor panel 17. The upper frame outer sidewall 94 is folded downward from an outer portion of the upper frame apex section 93 toward the floor panel 17. The upper frame inner sidewall 95 is folded downward from an inner portion of the upper frame apex section 93 toward the floor panel 17.

The upper frame outer flange 96 is folded rightward from the lower end portion of the upper frame outer sidewall 94 along the floor panel 17. The upper frame inner flange 97 is folded leftward from the lower end portion of the upper frame inner sidewall 95 along the floor panel 17.

The floor frame 26 is formed in a hat-shaped cross section by the upper frame apex section 93, the upper frame outer sidewall 94, the upper frame inner sidewall 95, the upper frame outer flange 96 and the upper frame inner flange 97.

The upper frame outer flange 96 and the upper frame inner flange 97 are joined to the upper surface 17a of the floor panel 17.

The upper frame inner flange 97 is connected to the lower frame outer flange 54 of the tunnel lower frame 21 via the floor panel 17 (in particular, the right ridge section 37). Further, the tunnel lower frame 21 is connected to the floor frame 26 using the gusset 24. Accordingly, rigidity and strength of the floor tunnel 18 can be further increased by the floor frame 26.

In addition, since the floor frame 26 is connected to the tunnel lower frame 21 using the gusset 24, the tunnel lower frame 21 can be more appropriately reinforced by the floor frame 26. Accordingly, the tunnel brace 22 can be strongly supported by the tunnel lower frame 21, and support strength of the tunnel brace 22 is increased.

Figure 13:
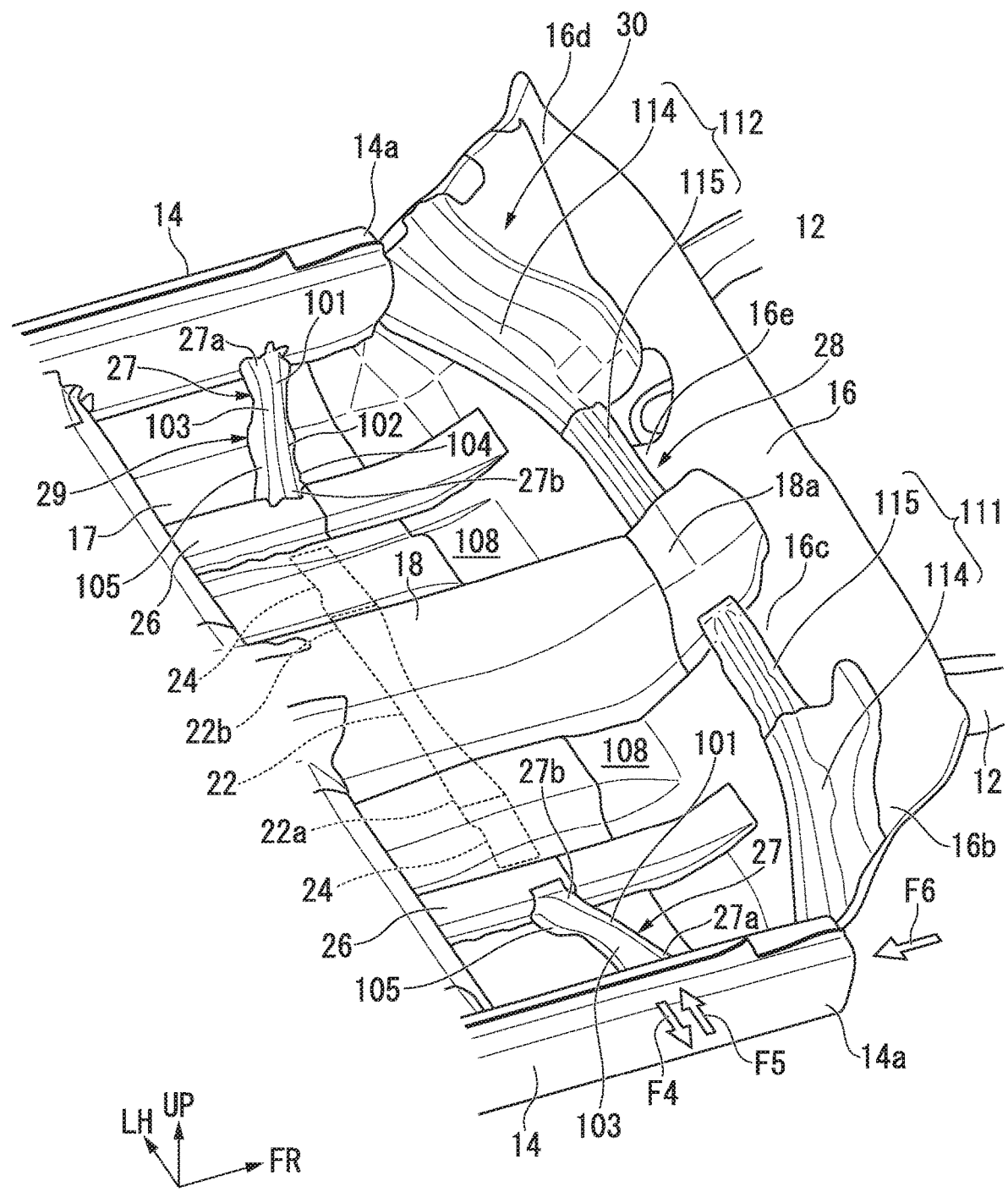
FIG. 13 is an enlarged perspective view showing a rectangular framework section in FIG. 1 in the embodiment of the present invention.

As shown in FIG. 13, the side sill 14 is installed at an outer side of the floor frame 26 in the vehicle width direction. The floor inclination brace 27 is laid on the side sill 14 and the floor frame 26. An outer end portion 27a of the floor inclination brace 27 is joined to the side sill 14.

In addition, an inner end portion 27b of the floor inclination brace 27 is joined to the floor frame 26.

The outer end portion 27a of the floor inclination brace 27 is disposed forward in the vehicle body than the inner end portion 27b. Accordingly, the floor inclination brace 27 extends in an inclined form from the floor frame 26 to the side sill 14 toward a front side of the vehicle body.

That is, the floor inclination brace 27 has a brace apex section 101, a brace front wall 102, a brace rear sidewall 103, a brace front flange 104 and a brace rear flange 105. The floor inclination brace 27 is formed in a hat-shaped cross section by the brace apex section 101, the brace front wall 102, the brace rear sidewall 103, the brace front flange 104 and the brace rear flange 105.

The brace front flange 104 and the brace rear flange 105 are joined to the upper surface 17a of the floor panel 17.

In addition, the floor inclination brace 27 on the right side is connected to the right end portion 22a of the tunnel brace 22 via the floor frame 26 and the gusset 24. Further, like the floor inclination brace 27 on the right side, the floor inclination brace 27 on the left side is also connected to the left end portion 22b of the tunnel brace 22 via the floor frame 26 and the gusset 24.

A rear cross member 29 is formed by the tunnel brace 22, the gusset 24 on the right side, the floor frame 26 on the right side, the floor inclination brace 27 on the right side, the gusset 24 on the left side, the floor frame 26 on the left side, and the floor inclination brace 27 on the left side.

The tunnel brace 22, the gusset 24 on the right side, and the gusset 24 on the left side extend in the vehicle width direction. In addition, the floor inclination brace 27 on the right side and the floor inclination brace 27 on the left side extend in an inclined form. Accordingly, the rear cross member 29 is formed in a trapezoidal shape when seen in a plan view by the tunnel brace 22, the gusset 24 on the right side, the gusset 24 on the left side, the floor inclination brace 27 on the right side, and the floor inclination brace 27 on the left side.

The rear cross member 29 is laid on the side sill 14 on the right side and the side sill 14 on the left side. The rear cross member 29 is disposed rearward in the vehicle body compared to a foot space 108 for an occupant.

Here, the tunnel brace 22 of the rear cross member 29 is laid on the floor tunnel 18 via the tunnel lower frame 21 on the right side (see FIG. 4) and the tunnel lower frame 21 on the left side. Accordingly, for example, when a tensile load F4 or a compressive load F5 is input to the rear cross member 29, the input loads F4 and F5 are supported by the rear cross member 29. Accordingly, it is possible for the rear cross member 29 to prevent the floor tunnel 18 from being deformed so as to open outward in the vehicle width direction due to the tensile load F4 into the rear cross member 29.

In addition, it is possible for the rear cross member 29 to prevent the floor tunnel 18 from being deformed inward in the vehicle width direction due to the compressive load F5 input to the rear cross member 29.

Here, the compressive load F5 is input to the rear cross member 29, for example, when an impact load F6 is input to a front end portion 14a of the side sill 14 on the right side due to a narrow offset collision.

The front cross member 28 is connected to the side sill 14 on the right side and the side sill 14 on the left side. The front cross member 28 includes a right front cross member 111 and a left front cross member 112.

The right front cross member 111 includes a first member 114 on the right side and a second member 115 on the right side. The first member 114 on the right side extends in an inclined form along a right wheel arch 16b of the lower dashboard 16 from the front end portion 14a of the side sill 14 on the right side to a front side of the vehicle body toward an inner side in the vehicle width direction. Since the first member 114 on the right side is joined to the right wheel arch 16b, a closed cross section is formed by the first member 114 on the right side and the right wheel arch 16b.

The second member 115 on the right side extends inward along a board right central section 16c of the lower dashboard 16 from the first member 114 on the right side to the front end portion 18a of the floor tunnel 18 in the vehicle width direction. Since the second member 115 on the right side is joined to the board right central section 16c of the lower dashboard 16, a closed cross section is formed by the second member 115 on the right side and the board right central section 16c.

The left front cross member 112 is a member that is substantially laterally symmetrical with respect to the right front cross member 111, and includes the first member 114 on the left side and the second member 115 on the left side. The first member 114 on the left side extends in an inclined form along a left wheel arch 16d of the lower dashboard 16 from the front end portion 14a of the side sill 14 on the left side to a front side of the vehicle body toward an inner side in the vehicle width direction. Since the first member 114 on the left side is joined to the left wheel arch 16d, a closed cross section is formed by the first member 114 on the left side and the left wheel arch 16d.

The second member 115 on the left side extends inward along a board left central section 16e of the lower dashboard 16 from the first member 114 on the left side to the front end portion 18a of the floor tunnel 18 in the vehicle width direction. Since the second member 115 on the left side is joined to the board left central section 16e of the lower dashboard 16, a closed cross section is formed by the second member 115 on the left side and the board left central section 16e.

The front cross member 28 is formed in a trapezoidal shape when seen in a plan view by the first member 114 on the right side, the second member 115 on the right side, the first member 114 on the left side, and the second member 115 on the left side.

The front cross member 28 is formed on the vehicle body forward from the foot space 108.

The rear cross member 29 is disposed rearward in the vehicle body than the front cross member 28. The rear cross member 29 is formed in a trapezoidal shape when seen in a plan view by the tunnel brace 22, the gusset 24 on the right side, the gusset 24 on the left side, the floor inclination brace 27 on the right side, and the floor inclination brace 27 on the left side.

Accordingly, a rectangular framework section 30 is formed by the front crossmember 28, the side sill 14 on the right side, the side sill 14 on the left side, and the rear cross member 29. The rectangular framework section 30 is formed in an octagonal frame shape when seen in a plan view. The foot space 108 is formed in an inner section of the rectangular framework section 30. That is, the foot space 108 is formed in a closed space that is formed in the rectangular framework section 30 when seen in a plan view.

Accordingly, the foot space 108 is reinforced by the front cross member 28, the side sill 14 on the right side, the side sill 14 on the left side, and the rear cross member 29. Accordingly, for example, when a front impact accident occurs, it is possible to prevent deformation of the foot space 108 using the rectangular framework section 30.

Further, the technical scope of the present invention is not limited to the above-mentioned embodiment and various modifications may be made without departing from the scope of the present invention.

For example, in the embodiment, while the example in which the floor panel ridge section 35 is formed on the floor panel 17 and the tunnel lower frame 21 is formed on the lower surface of the floor panel ridge section 35 (i.e., the lower surface 42a of the ridge apex section) has been described, there is no limitation thereto.

As another example, it is possible to provide a configuration in which the floor panel ridge section 35 is not formed on the floor panel 17. In this case, the tunnel lower frame 21 is installed on a lower surface 17b (see FIG. 3) of the floor panel 17, and the tunnel brace 22 is connected to the tunnel lower frame 21. Accordingly, rigidity and strength of the floor tunnel 18 can be increased by the tunnel lower frame 21.

Further, the tunnel lower frame 21 is connected to the floor frame 26 via the gusset 24 and the floor panel 17. Accordingly, rigidity and strength of the floor tunnel 18 can be further increased by the floor frame 26.

REFERENCE SIGNS LIST

10 Underbody structure
14 Side sill
17 Floor panel
17a Upper surface of floor panel
17b Lower surf ace of floor panel
18 Floor tunnel
21 Tunnel lower frame
22 Tunnel brace
22a, 22b Right and left end portions (both end portions)
22c Central section
22d Front edge portion
22e Rear edge portion
24 Gusset
26 Floor frame
27 Floor inclination brace
28 Front cross member
29 Rear cross member
35 Floor panel ridge section
36 First bead
42a Lower surface of ridge apex section (lower surface of floor panel ridge section)
57 Heat insulation plate
59a, 59b Front and rear attachment sections (pair of attachment sections)
69 Bolt (fastening member)
71 Front convex section
72 Central groove section
73 Rear convex section
75 Second bead
75c Inner section of second bead (center of gusset)
76 Working hole
76a Circumferential edge of working hole
77 Circumferential edge step difference section
78 Discharge groove
79 Front overhanging section
81 Rear overhanging section
83 Electrodeposition coating liquid
86 Joining section
108 Foot space
W1 Width dimension of right and left end portions
W2 Width dimension of central section

What is claim is:

1. A underbody structure of a vehicle body, comprising:
    a floor tunnel protruding upward from a floor panel of a vehicle and extending in a vehicle body forward/rearward direction;
    a tunnel brace laid on the floor tunnel and extending in a vehicle width direction;
    a tunnel lower frame installed on a lower surface of the floor panel and to which the tunnel brace is connected;
    a floor frame installed on an upper surface of the floor panel;
    a gusset configured to connect the tunnel lower frame to the floor frame; and
    a heat insulation plate that is disposed at a front side of a tunnel cross member of the floor tunnel and that is attached to the tunnel lower frame using a pair of attachment sections in the vehicle body forward/rearward direction,
    wherein the tunnel brace has:
    a front convex section formed at a front side of a vehicle body and extending in the vehicle width direction;

a central groove section that is formed rearward in the vehicle body than the front convex section and that is extending along the front convex section in the vehicle width direction; and a rear convex section that is formed rearward in the vehicle body than the central groove section and that is extending along the central groove section in the vehicle width direction, the front convex section, the central groove section and the rear convex section are formed to have equal width dimensions with each other in the vehicle body forward/rearward direction, and the tunnel brace is formed so as to have an M-shaped cross section by the front convex section, the central groove section and the rear convex section, a front edge portion and a rear edge portion of a central section of the tunnel brace are formed in a curved manner such that a width dimension of the tunnel brace in the vehicle body forward/rearward direction has a maximum value at both end portions in the vehicle width direction, and has a minimum value at the central section in the vehicle width direction, and the tunnel brace is attached between the pair of attachment sections of the heat insulation plate.

2. The underbody structure of a vehicle body according to claim 1, further comprising:

a side sill installed at an outer side of the floor frame in the vehicle width direction; and a floor inclination brace that is laid on the side sill and the floor frame and that is inclined forward, wherein the floor inclination brace is connected to the tunnel brace via the floor frame and the gusset and forms a rear cross member together with the tunnel brace and the gusset, and the rear cross member is disposed rearward in the vehicle body than a foot space for an occupant.

3. The underbody structure of a vehicle body according to claim 2, further comprising a front cross member that is connected to the side sill and that is installed forward in the vehicle body than the rear cross member, and the foot space is formed as a closed octagonal space when seen in a plan view by the front cross member, the side sill and the rear cross member.

4. The underbody structure of a vehicle body according to claim 1, wherein the floor panel has a floor panel ridge section on which the floor tunnel is laid, the tunnel lower frame is installed on a lower surface of the floor panel ridge section, and the tunnel brace and the gusset are disposed in a horizontal state.

5. The underbody structure of a vehicle body according to claim 1, wherein the tunnel brace and the gusset are fastened to the tunnel lower frame using a common fastening member.

6. The underbody structure of a vehicle body according to claim 1, wherein the gusset has an inner end portion on an inner side in the vehicle width direction that is connected to a bottom section of the tunnel lower frame, an outer end portion on an outer side in the vehicle width direction that is connected to the floor frame via the floor panel, and a working hole formed at a center thereof and configured to communicate with a joining section of the floor panel ridge section and the tunnel lower frame.

7. The underbody structure of a vehicle body according to claim 6, wherein the floor panel has a first bead, the gusset has a second bead that is continuous with the first bead, and the working hole is formed in an inner section of the second bead.

8. The underbody structure of a vehicle body according to claim 6, wherein the gusset has:

a circumferential edge step difference section in which a circumferential edge of the working hole is folded; and an electrodeposition coating liquid discharge groove that is continuous with the circumferential edge step difference section.

9. The underbody structure of a vehicle body according to claim 1, wherein the gusset has:

a front overhanging section that overhangs upward at a front side of the vehicle body; and a rear overhanging section that overhangs downward at a rear side of the vehicle body.

* * * * *